Jan. 14, 1941.  S. W. NICHOLSON  2,228,777
GUIDE FOR AUTOMOBILE WINDOWS
Filed Feb. 2, 1938  2 Sheets-Sheet 1
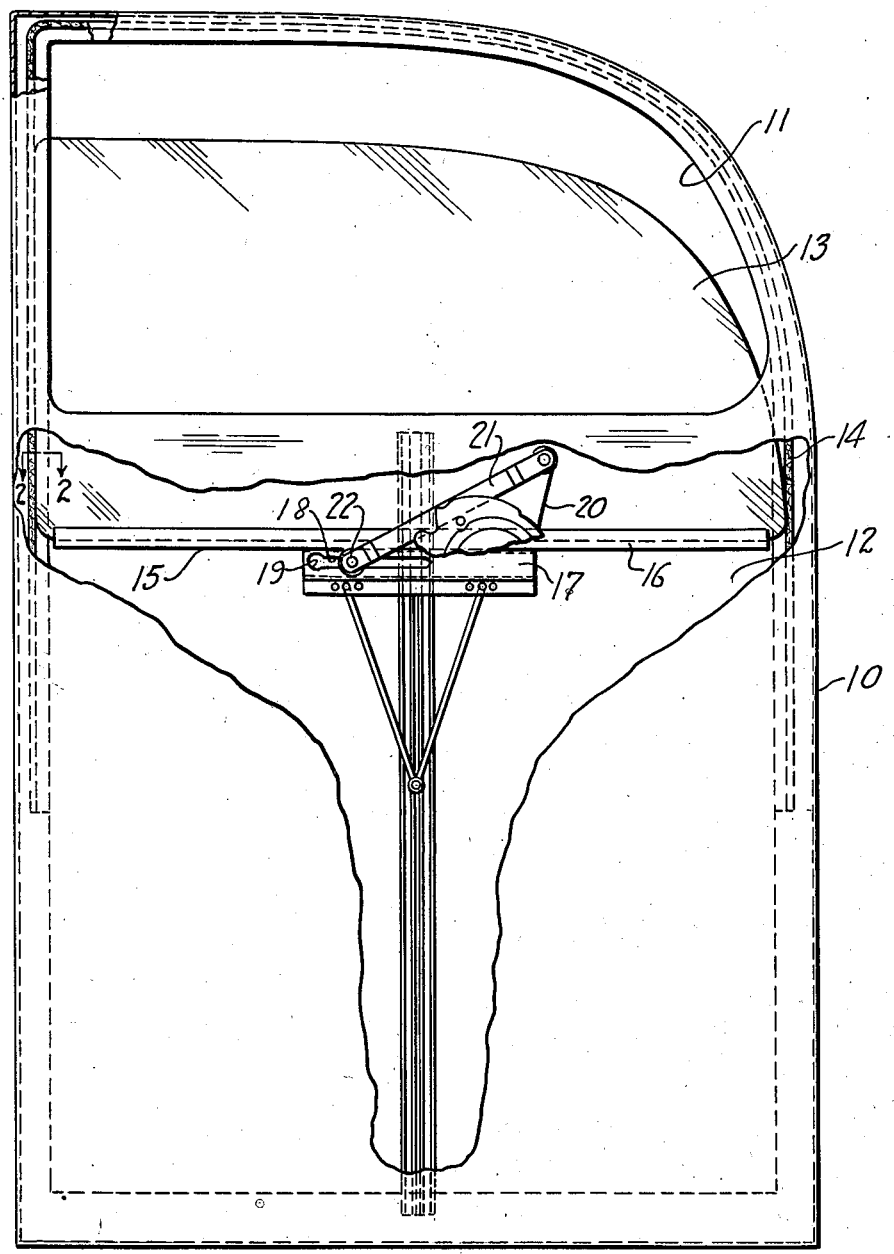
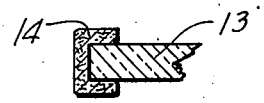
INVENTOR
Stanley W. Nicholson
BY
ATTORNEY

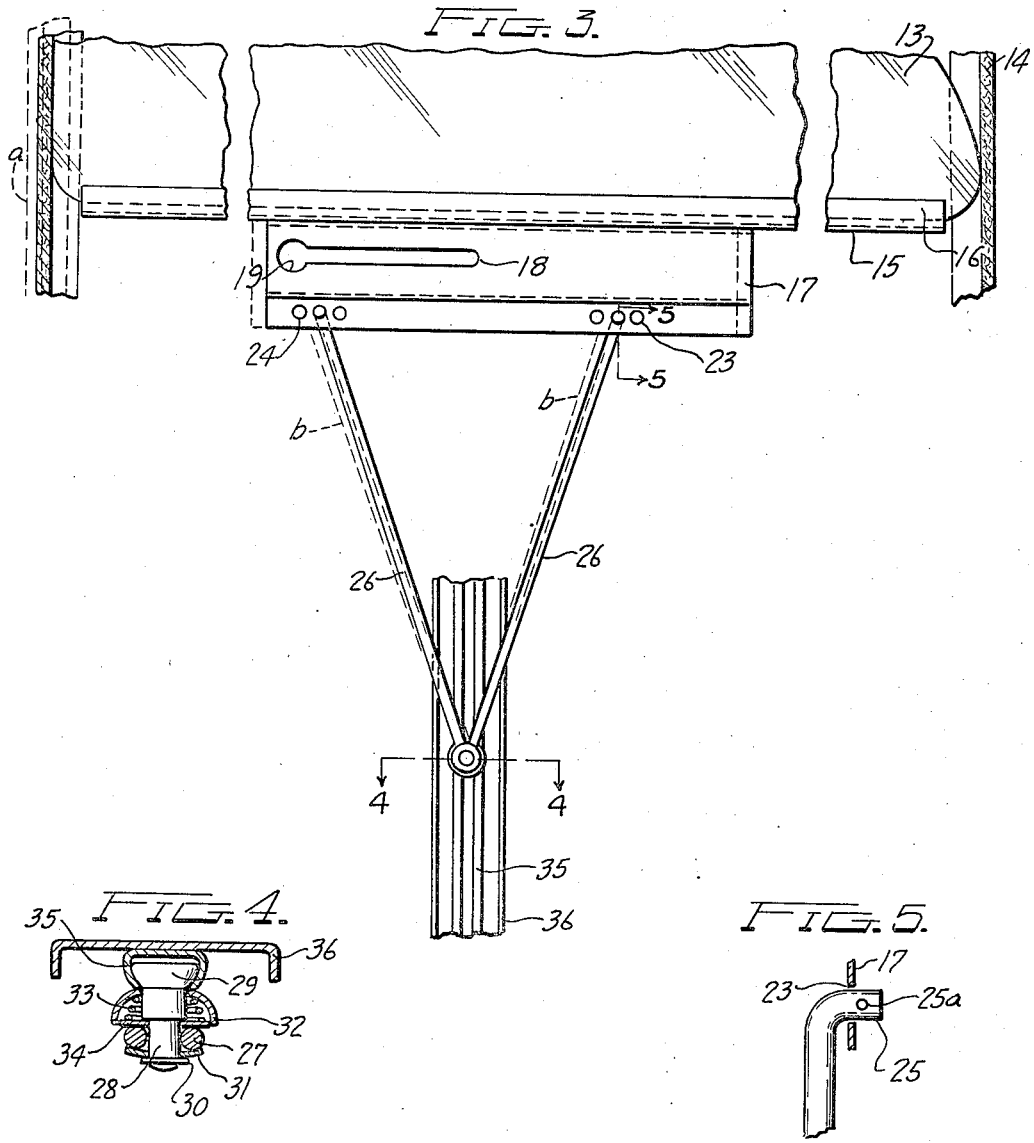

Patented Jan. 14, 1941

2,228,777

UNITED STATES PATENT OFFICE 2,228,777

GUIDE FOR AUTOMOBILE WINDOWS

Stanley W. Nicholson, Toledo, Ohio, assignor to Detroit Harvester Company, Detroit, Mich., a corporation of Michigan Application February 2, 1938, Serial No. 188,326

5 Claims. (Cl. 296—44)

This invention relates to vehicle windows particularly those used on automobiles and is concerned principally with the guiding of vertically movable automobile windows one or both side edge portions of which are so cut away that inadequate guiding can be obtained by the usual felt runways ordinarily disposed at the sides of the window opening.

An object of this invention is to produce a new and improved guide of the above character which is designed to enable the window glass to shift longitudinally thereby to compensate for or automatically accommodate itself to irregularities and misalignment of the runways or other parts and in this manner facilitate the sliding movement of the window and relieve the regulator mechanism from undue strain ordinarily occasioned by the improper or inaccurate arrangement of the runways or other parts.

Other objects and advantages will hereinafter appear and by way of illustration, an embodiment of the invention is shown on the accompanying drawings in which Figure 1 is a side elevation of an automobile door, a portion thereof being broken away to show the channel assembly, guideway and regulator;

Figure 2 is a transverse sectional view on the line 2—2 of Figure 1;

Figure 3 is an enlarged fragmentary elevation showing the lower portion of the window glass, the felt runways therefor, the channel assembly and rigid guideway;

Figure 4 is an enlarged transverse sectional view on the line 4—4 of Figure 3; and Figure 5 is an enlarged sectional elevation on the line 5—5 of Figure 3.

This application constitutes a continuation in part of my co-pending application Serial No. 153,486, entitled "Vehicle window guide."

The illustrated embodiment of the invention comprises a vehicle door 10 formed with a window opening 11 at its upper end and a well 12 in its lower portion into which a window glass 13 may be lowered to uncover the window opening 11. Surrounding the top and front and rear sides of the window opening 11 is a felt channel strip 14 which, in this instance, extends down into the well 12, thereby providing laterally spaced upright runways for the up and down edges of the window glass 13, at least portions of the latter at all times engaging in the runways. As is customary in the so-called stream line design of automobiles, at least one side of the window glass 13 is cut away so that insufficient or inadequate support or guiding is obtained from the runways to militate against tilting of the window glass.

Secured to the lower edge of the window glass 13 is a channel assembly generally indicated at 15 which comprises an elongate clip 16 which embraces the lower edge of the window glass and fixed to the clip 16 is a depending retainer panel 17 formed with a longitudinally elongate slot 18 having an enlarged opening 19 at one end. The window glass 13 is raised or lowered by regulator mechanism, only a portion of which is illustrated but since such mechanism forms no part of the present invention, detailed description and illustration is not considered necessary. As shown, the regulator has a crank arm 20 with which a link arm 21 cooperates. On the outer end of the link arm 21 is a stud or roller 22 which has a sliding fit in the slot 18, the opening 19 enabling the stud to be admitted to the slot. The swinging of the arm 20 in one direction or the other effects the raising and lowering of the window glass and reference is here made to my co-pending application Serial No. 132,738, wherein the structure and operation of such mechanism is fully shown and described.

The lower edge of the portion of the retainer is formed with two series of holes 23 and 24 to receive the inturned ends 25 of a wire guide 26 in the form of a substantially V-shaped rod, the lower end of which is bent to form a loop 27 to receive the shank 28 of a stud having an enlarged head 29, the surface of which is rounded. The opposite end of the stud is provided with a flange 30 and a washer 31 is interposed between the loop 27 and the flange 30. Mounted on the stud is a washer 32 which is urged toward the enlarged head 29 by a coil spring 33, the opposite end of which bears against a washer 34 resting against the loop 27.

The enlarged head 29 of the stud slides in a vertically disposed channel strip 35 which is disposed intermediate the vertical portions of the runway 14 and is curved to fit the outer curved surface of the head 29. The spring pressed washer 32 holds the head 29 yieldably in engagement with the channel 35, sufficient clearance being provided by the channel that slight longitudinal movement of the stud is afforded. The channel 35 is suitably fixed to a mounting plate 36 suitably anchored within the well of the door.

Attention is particularly directed to Figure 3 which illustrates that the diverging arms of the V-shaped wire guide 26 are resiliently flexible or have a slight amount of spring action urging the window glass 13 in a longitudinal direction. The dotted line *a* indicates the position that the runway 14 on that side should assume for the window glass to be properly positioned relative to the channel guideway 35 but owing to misalignment of parts which frequently takes place in large scale production of automobiles, the actual positioning of the felt runway is in the full line position adjacent the dotted line position *a*. This necessitates moving the window glass 13 to the right of Figure 3. As a consequence, diverging arms of the wire guide 26 move from the dotted lines b to the full lines shown on this figure, the retainer 17 being correspondingly moved. This results in the window 13 being urged to the left of Figure 3 against the left-hand runway but it will readily be apparent that in absence of a yieldable device of this character, considerable difficulty would be occasioned in changing the position of the vertical guideway 35 or making other adjustments to compensate for the inaccuracies or misalignment of parts. Furthermore in the event that the runways 14 are irregular or have not been accurately positioned vertically, the guide 26 can, within limitations, enable the window glass 13 to shift longitudinally and automatically accommodate itself to such irregularities or misalignments.

It will be apparent that in the vertical movement of the window glass, the enlarged head 29 rides in the channel 35 and owing to the construction and arrangement of the guide 26, tilting of the glass is avoided. It will also be apparent that in the event that the guideway 35 is inaccurate or curved slightly in one direction or the other in portions of its length, the head 29 can yield accordingly, the washer 32 yielding to accommodate such movement and prevent binding of the parts. The inturned ends 25 of the arms of the guide 26 can be placed in one or another of the series of holes 23 and 24 to level the glass in the proper manner. It will be observed that a pin 25a extends through the inturned ends for securing the parts in assembled relation.

It is to be understood that numerous changes in details of construction, arrangement and operation may be effected without departing from the spirit of the invention especially as defined in the appended claims.

What I claim is:

1. In a vehicle having a window opening and a window glass movable vertically to cover and uncover the opening, a channel assembly on the lower edge portion of the window glass, regulator mechanism cooperating with the channel assembly for raising and lowering the window glass, oppositely disposed runways for guiding the up and down edges of the window glass in the region of the window opening, a vertically disposed guideway below the opening and normally disposed in a predetermined position relative to said runways, a V-shaped rod connected at its upper ends to the channel assembly, and means providing a connection between the apex of said V-shaped rod and said guideway, said rod being sufficiently resilient to enable longitudinal shifting movement of the window glass.

2. In a vehicle having a window opening and a window glass movable vertically to cover and uncover the opening, a channel assembly on the lower edge portion of the window glass, regulator mechanism cooperating with the channel assembly for raising and lowering the window glass, oppositely disposed runways for guiding the up and down edges of the window glass in the region of the window opening, a vertically disposed guideway below the opening and normally disposed in a predetermined position relative to said runways, a V-shaped rod having the upper ends of the diverging arms thereof connected to the channel assembly, and a connection between the lower end of said rod and said guideway enabling sliding movement of said rod relative to said guideway, the diverging arms being resiliently flexible to enable longitudinal shifting movement of the window glass.

3. In a vehicle having a window opening and a window glass movable vertically to cover and uncover the opening, a channel assembly on the lower edge portion of the window glass, regulator mechanism cooperating with the channel assembly for raising and lowering the window glass, oppositely disposed runways for guiding the up and down edges of the window glass in the region of the window opening, a vertically disposed guideway below the opening and normally disposed in a predetermined position relative to said runways, a V-shaped rod having the upper ends of the diverging arms thereof connected to the channel assembly, and a spring tensioned sliding connection between the lower end of said arm and said guideway enabling said rod to slide in said guideway.

4. In a vehicle having a window opening and a window glass movable vertically to cover and uncover the opening, a channel assembly on the lower edge portion of the window glass, regulator mechanism cooperating with the channel assembly for raising and lowering the window glass, oppositely disposed runways for guiding the up and down edges of the window glass in the region of the window opening, a vertically disposed guideway below the opening and normally disposed in a predetermined position relative to said runway, a V-shaped rod having the upper ends of the diverging arms thereof connected to the channel assembly, a spring tensioned sliding connection between the lower end of said arm and said guideway enabling said rod to slide in said guideway, and an adjustable connection between the ends of the diverging arms of said V-shaped rod and the channel assembly.

5. In a vehicle having a window opening and a window glass movable vertically to cover and uncover the opening, a channel assembly on the lower edge portion of the window glass, regulator mechanism cooperating with the channel assembly for raising and lowering the window glass, oppositely disposed runways for guiding the up and down edges of the window glass in the region of the window opening, a vertically disposed guideway below the opening and normally disposed in a predetermined position relative to said runways, said guideway being disposed intermediate said runways and including a vertically elongate channel strip, a V-shaped rod having the upper ends of the diverging arms thereof engaging the channel assembly, means enabling said arms to be adjusted longitudinally of the window glass, said means including a series of holes formed in the channel assembly with which inturned ends of said rod are selectively engageable, a stud secured to the lower end of said V-shaped rod and engaging in said channel, a spring presser washer on said stud engaging the outer edge portion of said channel for yieldingly retaining said stud in engagement with the channel, the diverging arms of said V-shaped rod being sufficiently resilient to enable longitudinal shifting movement of the window glass to compensate for misalignment or irregularities of the runways and guideway.

STANLEY W. NICHOLSON.